United States Patent
Chang et al.

(10) Patent No.: US 6,771,425 B2
(45) Date of Patent: Aug. 3, 2004

(54) SYSTEM CAPABLE OF CHANGING WAVELENGTH AND INTENSITY OF OUTPUT LIGHT

(75) Inventors: Sean Chang, Tao Yuan County (TW); Shih-chien Chang, Taipei County (TW)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 10/194,567
(22) Filed: Jul. 12, 2002

(65) Prior Publication Data

US 2003/0133197 A1 Jul. 17, 2003

(30) Foreign Application Priority Data

Jan. 15, 2002 (TW) .......................................... 91100517

(51) Int. Cl.[7] ........................ G02B 27/14; G02B 27/00; G02B 5/28
(52) U.S. Cl. ........................ 359/634; 359/578; 359/589
(58) Field of Search ............................... 359/578, 589, 359/634

(56) References Cited

U.S. PATENT DOCUMENTS 6,539,145 B1 * 3/2003 Auracher et al. ............. 385/24
6,621,632 B2 * 9/2003 Zhou ........................ 359/577

FOREIGN PATENT DOCUMENTS

WO     WO 02/071121 A2 * 9/2002 ............ G02B/6/34

\* cited by examiner

*Primary Examiner*—David N. Spector
(74) *Attorney, Agent, or Firm*—Martine & Penilla, LLP

(57) ABSTRACT

A system capable of tuning the wavelength and intensity of an output light includes an input end, a first output end, a second output end, a first rotatable optical device, a second rotatable optical device, and a third optical device. The input end is used to receive a first optical signal and a second optical signal. When the angle of the first rotatable optical device is adjusted, the first optical signal is able to pass through and the second optical signal is reflected. The second rotatable optical device allows the first optical signal to be outputted from the first output end. When the angle of the second rotatable optical device is adjusted, the intensity of the first optical signal outputted from the first output end changes. The angle of the third rotatable optical device is adjusted with respect to the angle of the first rotatable optical device, so that the second optical signal can be outputted from the second output end.

32 Claims, 4 Drawing Sheets

SYSTEM CAPABLE OF CHANGING WAVELENGTH AND INTENSITY OF OUTPUT LIGHT

BACKGROUND OF THE INVENTION

1. Field of the Invention

The present invention relates to a system capable of tuning the wavelength and intensity of output light and, more particularly, to a system capable of tuning the wavelength and intensity of output light by adjusting the position of the optical device.

2. Description of the Related Art

During the past few years, owing to the technology improvement and market demands, all kinds of photoelectric products tend to be developed as light-weight, small-size, and multi-functional products.

Generally, a tunable filter is made of a transparent material having a particular refractive index in order to filter light beams of specific wavelengths by changing the incident angle of light. Referring to FIG. 1, the filters 111 and 112 are attached to the flat glasses 101 and 102, respectively. When a ray of light having wavelengths $\lambda_1$, $\lambda_2$, and $\lambda_3$ is incident onto the filter 111, the position of the flat glass 101 is adjusted so that the filter 111 reflects the light beam of the wavelength $\lambda_1$ and allows the light beam of other wavelengths to pass through. In addition, when the light ray is incident onto the filter 112, the position of the flat glass 102 is adjusted so that the filter 112 reflects the light beam of the wavelength $\lambda_2$ and filters the light beam of the wavelength $\lambda_3$.

An optical attenuator is used to change the intensity of output light rays. For instance, it can be applied to receivers so as to adjust the intensity of light dynamically, thereby preventing the receivers from being saturated. Referring to FIG. 2, the optical attenuator can be an ND filter 201 having different optical absorption at different positions. For example, after the light beam of the wavelength $\lambda_1$ passes through the ND filter 201, the intensity of the output light beam is attenuated and the corresponding intensity is changed to $\lambda_1'$. Moreover, the angle of the ND filter 201 can be adjusted to achieve the purpose of providing different amounts of attenuation for light.

Therefore, it is a vital task to modularize tunable filters and light attenuators so as to accomplish the object of having photoelectric products being light in weight, small in size, multi-functional, and low in cost.

SUMMARY OF THE INVENTION

In view of the above task, the object of the present invention is to provide a system capable of tuning the wavelength and intensity of output light as well as having functions of the tunable filter and the optical attenuator at the same time.

Also, in the present invention, the angles of the optical devices can be adjusted to filter light beams of particular wavelengths and adjusting the intensity of output light beams.

To accomplish the above object, the present invention provides a system capable of tuning the wavelength and intensity of the output light. The system includes an optical input end, a first optical output end, a second optical output end, a first rotatable optical device, a second rotatable optical device, and a third rotatable optical device. The optical input end is used to receive a first optical signal and a second optical signal. When the angle of the first rotatable optical device is adjusted, the first optical signal is allowed to pass through and the second optical signal is reflected. The second rotatable optical device allows the first optical signal to be outputted from the first optical output end. When the angle of the second rotatable optical device is adjusted, the intensity of the first optical signal outputted from the first optical output end is changed. The angle of the third rotatable optical device is adjusted with respect to the angle of the first rotatable optical device so that the second optical signal can be outputted from the second optical output end.

As described above, the system capable of tuning the wavelength and intensity of the output light according to the present invention adjusts the angles of the three rotatable optical devices so that the filters are able to filter the light beam of a specific wavelength and adjust the output intensity of the filtered light beam.

BRIEF DESCRIPTION OF THE DRAWINGS

These and other objects, features, and advantages of the present invention will become apparent with reference to the following descriptions and accompanying drawings, wherein.

DETAILED DESCRIPTION OF THE PREFERRED EMBODIMENT

Figure 1:
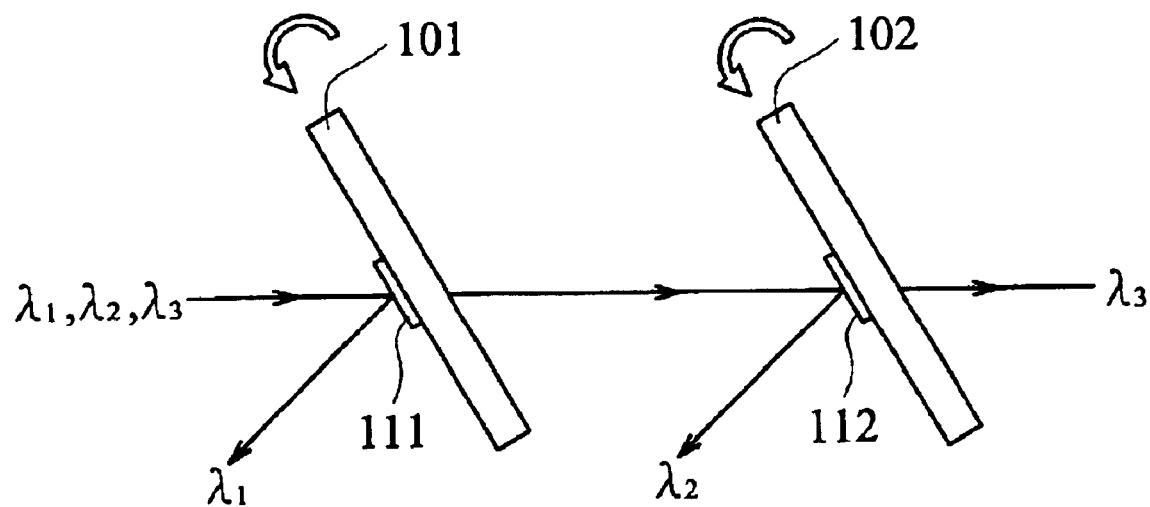
FIG. 1 is a schematic diagram of a conventional filter.
Figure 2:
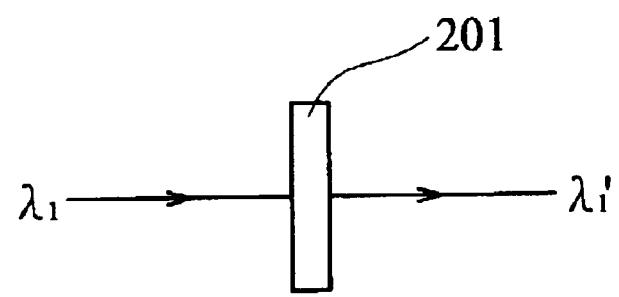
FIG. 2 is a schematic diagram of a conventional optical attenuator.
Figure 3:
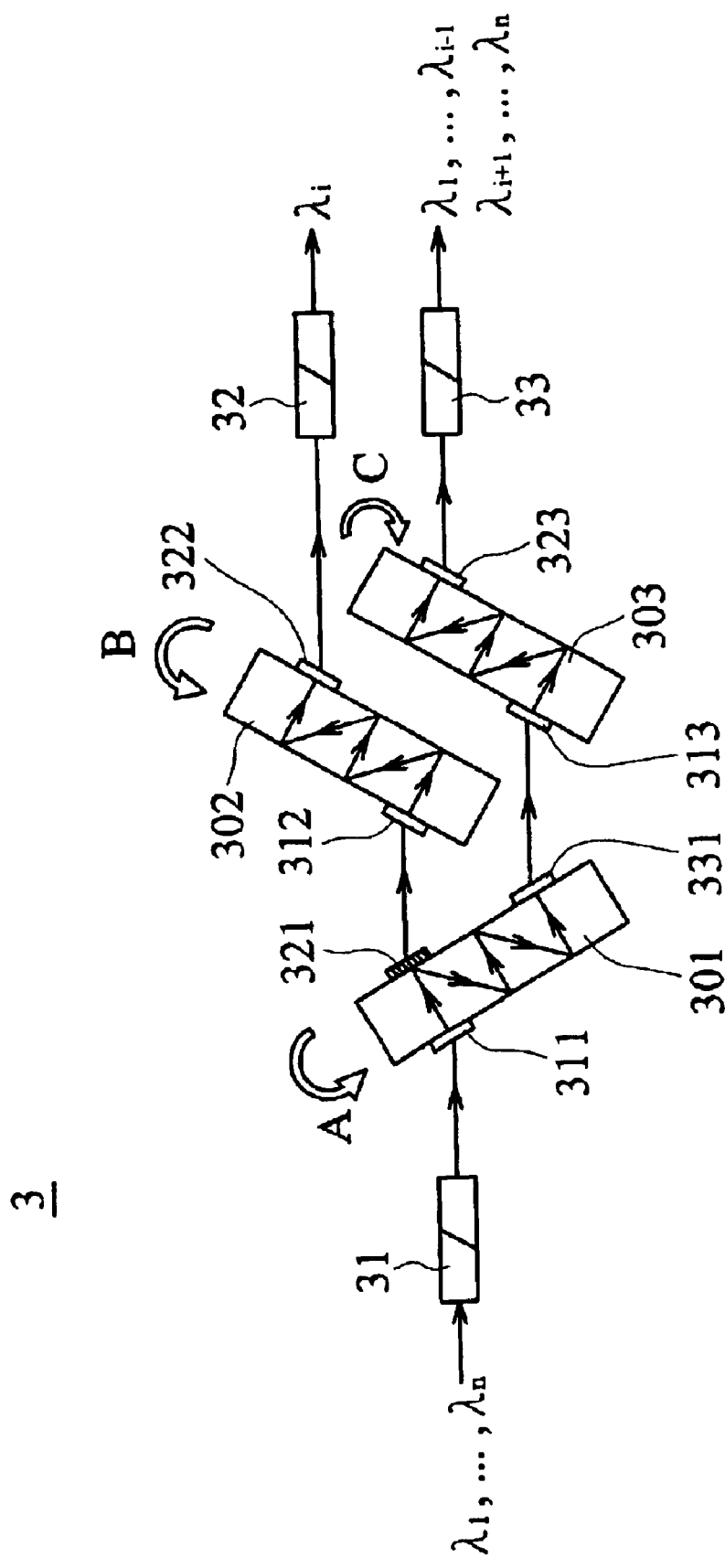
FIG. 3 is a schematic diagram according to a first preferred embodiment of the invention.

Referring to FIG. 3, the system 3 capable of tuning the wavelength and intensity of the output light according to the present invention includes an optical input end, a first optical output end, a second optical output end, a first rotatable optical device 301, a second rotatable optical device 302, and a third rotatable optical device 303. The optical input end is provided with a collimator 31, the first optical output end is provided with a collimator 32, and the second optical output end is provided with a collimator 33. The collimators 31, 32, and 33 allow light rays to be inputted and outputted in parallel.

The collimator 31 is used to receive a light signal having wavelengths $\lambda_1, \ldots \lambda_n$. The first rotatable optical device 301 can be a flat glass adhered or plated with anti-reflective (AR) coatings 311 and 331. The light ray is incident onto a filter 321 after passing through the AR coating 311. If the first rotatable optical device 301 rotates along the direction A, the incident angle of the light ray incident onto the filter 321 changes. For the reason that the filter 321 is made of a dielectric material with a specific refractive index, the filter 321 filters the light beam of a specific wavelength depending on the optical interference effect when the incident angle of light changes. Referring to FIG. 3, the light beam (referred to as a first optical signal) of the wavelength $\lambda_i$ passes through the filter 321, and the light beam (referred to as a second optical signal) of the remaining wavelengths $\lambda_1, \ldots, \lambda_{i-1}$ and $\lambda_{i+1}, \ldots, \lambda_n$ are reflected by the filter 321.

The second rotatable optical device 302 can be a flat glass adhered or plated with AR coatings 312 and 322. After passing through the AR coating 312, the light beam of the wavelength $\lambda_i$ is reflected several times within the second rotatable optical device 302 and then passes through the AR coating 322 to be outputted in parallel through the collimator 32. When the second rotatable optical device 302 rotates along the direction B, the intensity of light rays entering the collimator 33 may be affected by changing the angle of the second rotatable optical device 302 for the reason that the intensity of the output light is in the form of Gaussian distribution. In other words, the intensity of light rays outputted from the collimator 303 is modified by changing the angle of the second rotatable optical device 302.

The third rotatable optical device 303 can be a flat glass adhered or plated with AR coatings 313 and 323. The angle of the third rotatable optical device 303 is adjusted with respect to the angle of the first rotatable optical device. For instance, the third rotatable optical device 303 is rotated along the direction C, as shown in FIG. 3, so that the light beams passing through the AR coating 331 on the first rotatable optical device 301, i.e. the light beams of the wavelengths $\lambda_1, \ldots, \lambda_{i-1}$ and $\lambda_{i+1}, \ldots, \lambda_n$, are able to enter the AR coating 313 on the third rotatable optical device 303. After reflected several times, the light beams pass through the AR coating 323 and are outputted through the collimator 33.

Figure 4:
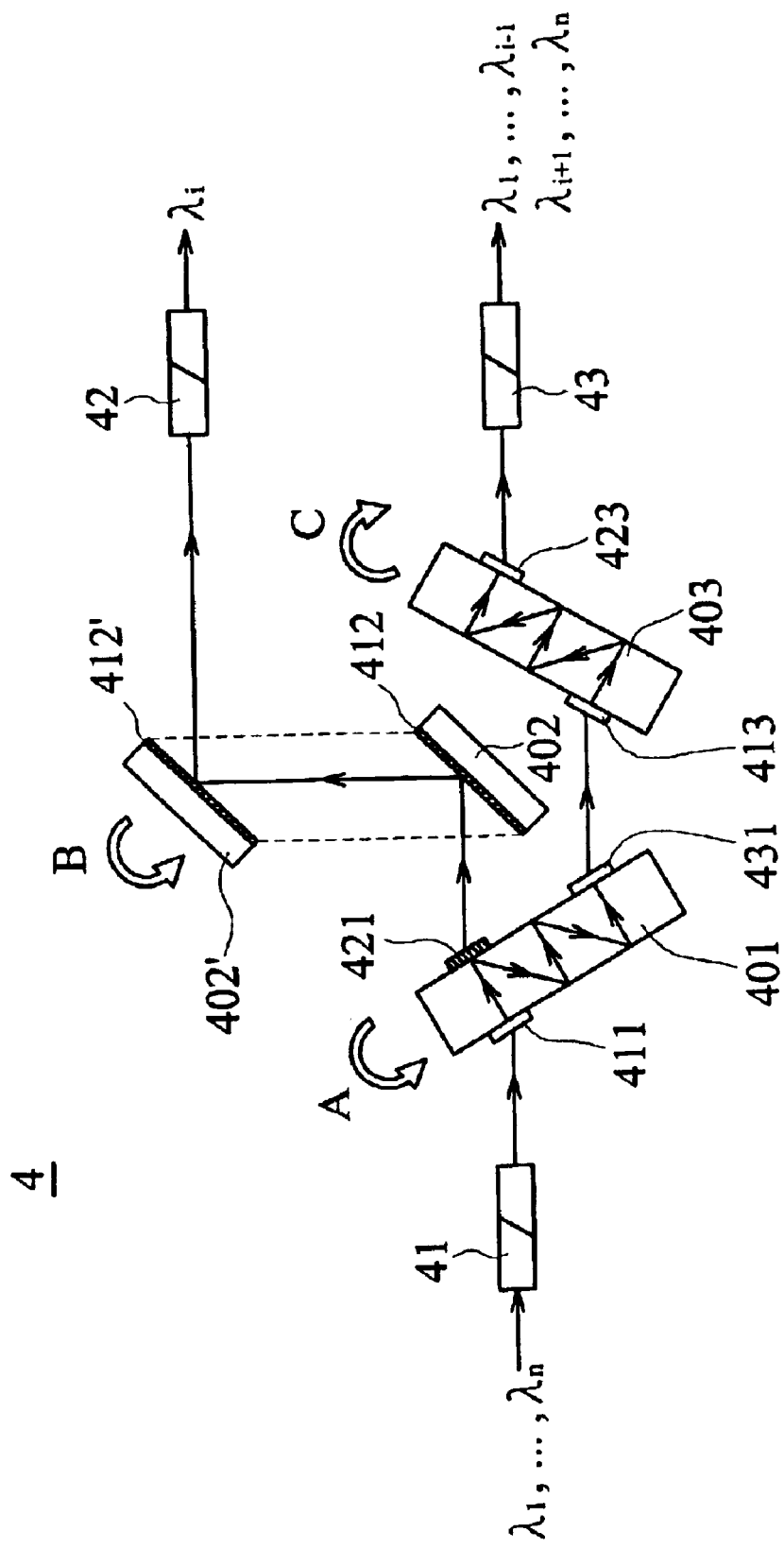
FIG. 4 is a schematic diagram according to a second preferred embodiment of the invention.

Referring to FIG. 4, the system 4 capable of changing the intensity of the output light according to the second embodiment of the invention includes an optical input end, a first optical output end, a first rotatable optical device 401, a second rotatable optical device 402 and 402', and a third rotatable optical device 403. The optical input end is provided with a collimator 41, the first optical output end is provided with a collimator 42, and the second optical output end is provided with a collimator 43. The collimators 41, 42, and 43 allow light rays to be inputted and outputted in parallel.

The first rotatable optical device 401, the second rotatable optical device 402 and 402', and the third rotatable optical device 403 are flat glasses. The first rotatable optical device 401 is provided with a filter 421, and AR coatings 411 and 431. The third rotatable optical device 403 is provided with AR coatings 413 and 423. The incident plane of the second rotatable optical device 402 is plated with a total reflection coating 412. In this embodiment, the first rotatable optical device 401 and the third rotatable optical device 403 function and operate in the same manner as the first rotatable optical device 301 and the third rotatable optical device 303 in the first embodiment. More specifically, the angle of the first rotatable optical device 401 is rotated along the direction A as shown in FIG. 4 to filter the light beam of the desired wavelength while the angle of the third rotatable optical device 403 is adjusted along the direction C with respect to the rotated angle of the first rotatable optical device so as to output the light beams of the remaining wavelengths.

When the light beam of the wavelength $\lambda_i$ filtered by the filter 421 located at the first rotatable optical device 401 is incident onto the second rotatable optical device 402, the light beam is reflected and then incident onto the second rotatable optical device 402' because the second rotatable optical device 402 is plated with the total reflection coating 412. Similarly, the light beam is outputted through the collimator 42 due to the reflection provided by the total reflection coating 412' plated on the second rotatable optical device 402'. When the second rotatable optical device 402' rotates along the direction B as shown in FIG. 4, the intensity of the light beam outputted from the collimator 42 may be changed by adjusting the angle of the second rotatable optical device 402' for the reason that the intensity of the output light is in the form of Gaussian distribution.

Figure 5:
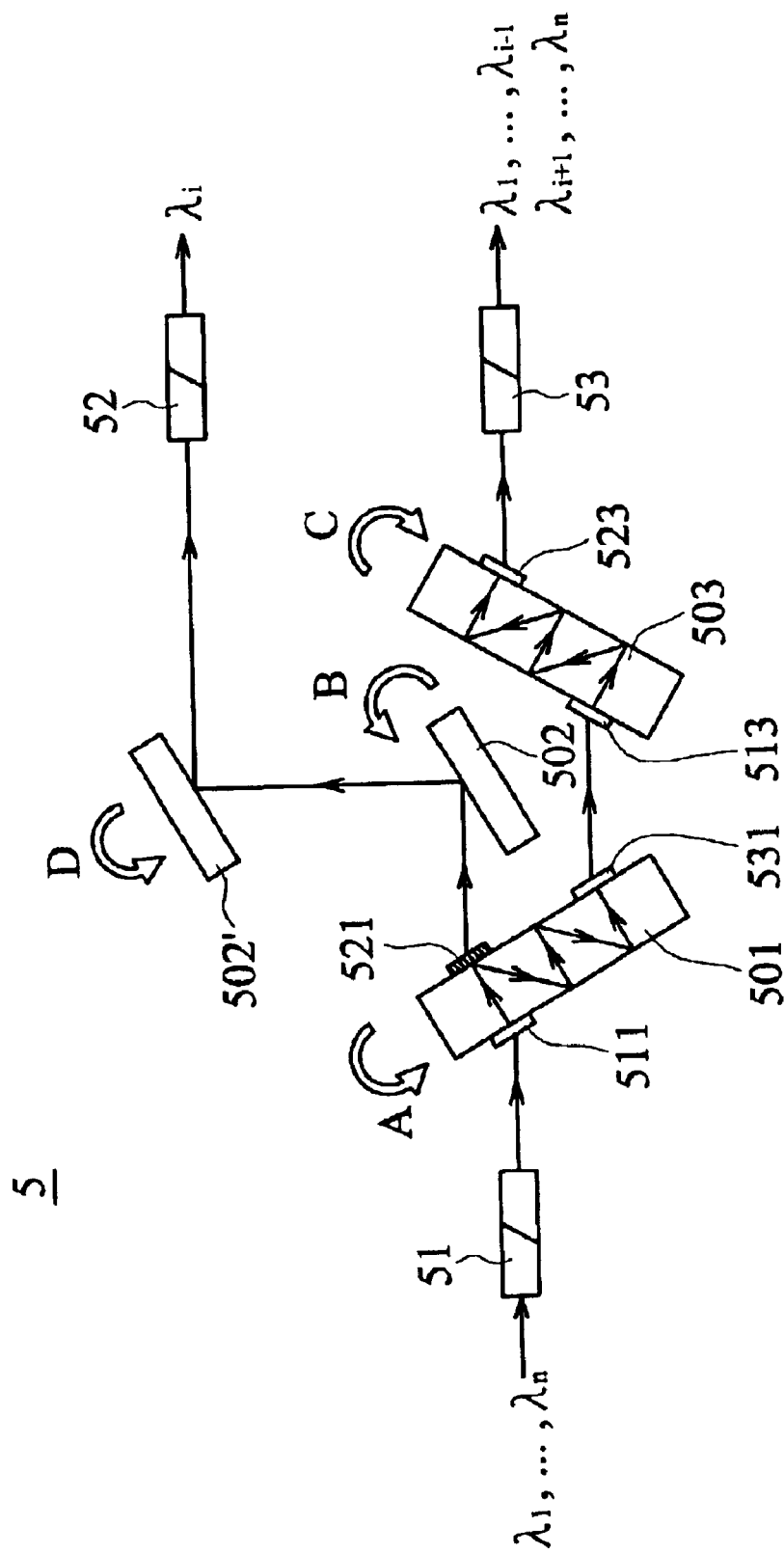
FIG. 5 is a schematic diagram according to a third preferred embodiment of the invention.

FIG. 5 shows the system 5 capable of tuning the wavelength and intensity of the output light according to the third preferred embodiment of the invention. In this embodiment, the first rotatable optical device 501, the third rotatable optical device 503, the filter 521 located at the first rotatable optical device 501, and the AR coatings 511, 531, 513, and 523 respectively located on the first rotatable optical device and the third rotatable optical device 503 operate and function in the same manner as those in the first preferred embodiment and the second preferred embodiment. Therefore, the detailed description is omitted.

In this embodiment, the second rotatable optical device 502 and 502' is a set of mirrors for reflecting the light beam of wavelength $\lambda_i$ filtered by the filter 521. The second rotatable optical device 502 can rotate along the direction B as shown in FIG. 5 to change the incident angle of the light beam, thereby changing the transmitting direction of the optical path. When the incident angle of the light beam incident onto the second rotatable optical device 502 changes, the intensity of the light beam outputted from the collimator 52 also changes accordingly. Similarly, when the second rotatable optical device 502' rotates along the direction D as shown in FIG. 5, or when the position angles of the second rotatable optical device 502 and 502' are simultaneously changed, the purpose of changing the intensity of the output light can also be achieved.

Conclusive from the above, the incident angle of the filter located on the first rotatable optical device can be changed by adjusting the angle of the first rotatable optical device so as to filter a light beam at a particular wavelength. In addition, the intensity of the light beam of the particular wavelength outputted from a collimator can be adjusted by adjusting the angle of the second rotatable optical device. Moreover, the light beams of the wavelengths other than the above-mentioned specific wavelength can be outputted from another collimator by adjusting the angle of the third rotatable optical device. Therefore, the three rotatable optical devices can modularize the adjustable filters and light attenuators, thereby achieving the object of optical devices being light in weight, small in size, multi-functional and low in cost.

It should be noted that the aforesaid filters can also be designed as filters that are targeted to reflect a specific wavelength $\lambda_i$ and allow the remaining wavelengths $\lambda_1, \ldots, \lambda_{i-1}$ and $\lambda_{i+1}, \ldots, \lambda_n$, to pass through.

While the invention has been described by way of example and in terms of the preferred embodiment, it is to be understood that the invention is not limited to the disclosed embodiment. To the contrary, it is intended to cover various modifications and similar arrangements as would be apparent to those skilled in the art Therefore, the scope of the appended claims should be accorded the broadest interpretation so as to encompass all such modifications and similar arrangements.

What is claimed is:

1. A system capable of tuning a wavelength and an intensity of an output light, comprising:

an input end for receiving a first optical signal and a second optical signal;

a first output end;

a second output end;

a first rotatable optical device for allowing said first optical signal to pass through and reflecting said second optical signal when the angle of said first rotatable optical device is adjusted;

a second rotatable optical device for allowing said first optical signal to be outputted from said first output end, said second rotatable optical device being provided with a plurality of total reflection coatings, and wherein the intensity of said first optical signal outputted from said first output end is changed when the angle of said second rotatable optical device is adjusted; and a third rotatable optical device whose angle is adjusted in accordance with the angle of said first rotatable optical device in such a way that said second optical signal can be outputted from said second output end.

2. The system according to claim 1, wherein said first rotatable optical device is provided with a filter.

3. The system according to claim 1, wherein said first rotatable optical device is a flat glass.

4. The system according to claim 1, wherein said second rotatable optical device is a flat glass.

5. The system according to claim 1, wherein said third rotatable optical device is a flat glass.

6. The system according to claim 1, wherein said first rotatable optical device is provided with a plurality of anti-reflective (AR) coatings.

7. The system according to claim 1, wherein said second rotatable optical device is provided with a plurality of anti-reflective (AR) coatings.

8. The system according to claim 1, wherein said third rotatable optical device is provided with a plurality of anti-reflective (AR) coatings.

9. The system according to claim 1, wherein each of said input end and said first and said second output ends is provided with a collimator.

10. A system capable of tuning a wavelength and an intensity of an output light, comprising:

an input end for receiving a first optical signal and a second optical signal;

a first output end;

a second output end;

a first rotatable optical device for allowing said first optical signal to pass through and reflecting said second optical signal when the angle of said first rotatable optical device is adjusted; and a second rotatable optical device for allowing said first optical signal to be outputted from said first output end, said second rotatable optical device being provided with a plurality of total reflection coatings, and wherein the intensity of said first optical signal outputted from said first output end is changed when the angle of said second rotatable optical device is adjusted.

11. The system according to claim 10, further comprising:

a third rotatable optical device whose angle is adjusted in accordance with the angle of said first rotatable optical device in such a way that said second optical signal can be outputted from said second output end.

12. The system according to claim 10, wherein said first rotatable optical device is provided with a filter.

13. The system according to claim 10, wherein each of said first and said second rotatable optical devices is a flat glass.

14. The system according to claim 10, wherein each of said first and said second rotatable optical devices is provided with a plurality of anti-reflective (AR) coatings.

15. The system according to claim 10, wherein each of said input end and said first and said second output ends is provided with a collimator.

16. The system according to claim 11, wherein said third rotatable optical device is a flat glass and provided with a plurality of anti-reflective (AR) coatings.

17. A system capable of tuning a wavelength and an intensity of an output light, comprising:

an input end for receiving a first optical signal and a second optical signal;

a first output end;

a second output end;

a first rotatable optical device for allowing said first optical signal to pass through and reflecting said second optical signal when the angle of said first rotatable optical device is adjusted;

a second rotatable optical device for allowing said first optical signal to be outputted from said first output end, said second rotatable optical device being a set of mirrors, and wherein the intensity of said first optical signal outputted from said first output end is changed when the angle of said second rotatable optical device is adjusted; and a third rotatable optical device whose angle is adjusted in accordance with the angle of said first rotatable optical device in such a way that said second optical signal can be outputted from said second output end.

18. The system according to claim 17, wherein said first rotatable optical device is provided with a filter.

19. The system according to claim 17, wherein said first rotatable optical device is a flat glass.

20. The system according to claim 17, wherein said second rotatable optical device is a flat glass.

21. The system according to claim 17, wherein said third rotatable optical device is a flat glass.

22. The system according to claim 17, wherein said first rotatable optical device is provided with a plurality of anti-reflective (AR) coatings.

23. The system according to claim 17, wherein said second rotatable optical device is provided with a plurality of anti-reflective (AR) coatings.

24. The system according to claim 17, wherein said third rotatable optical device is provided with a plurality of anti-reflective (AR) coatings.

25. The system according to claim 17, wherein each of said input end and said first and said second output ends is provided with a collimator.

26. A system capable of tuning a wavelength and an intensity of an output light, comprising:

an input end for receiving a first optical signal and a second optical signal;

a first output end;

a second output end;

a first rotatable optical device for allowing said first optical signal to pass through and reflecting said second optical signal when the angle of said first rotatable optical device is adjusted; and a second rotatable optical device for allowing said first optical signal to be outputted from said first output end, said second rotatable optical device being a set of mirrors, and wherein the intensity of said first optical signal outputted from said first output end is changed when the angle of said second rotatable optical device is adjusted.

27. The system according to claim 26, further comprising:

a third rotatable optical device whose angle is adjusted in accordance with the angle of said first rotatable optical device in such a way that said second optical signal can be outputted from said second output end.

28. The system according to claim 26, wherein said first rotatable optical device is provided with a filter.

29. The system according to claim 26, wherein each of said first and said second rotatable optical devices is a flat glass.

30. The system according to claim 26, wherein each of said first and said second rotatable optical devices is provided with a plurality of anti-reflective (AR) coatings.

31. The system according to claim 26, wherein each of said input end and said first and said second output ends is provided with a collimator.

32. The system according to claim 27, wherein said third rotatable optical device is a flat glass and provided with a plurality of anti-reflective (AR) coatings.

* * * * *